(No Model.) 2 Sheets—Sheet 1.

R. P. WHITCHER & J. FITZ GIBBONS.
CAR BRAKE CLAMP.

No. 562,684. Patented June 23, 1896.

WITNESSES:
Earl Vaughan
George L. Dolbeare

INVENTORS:
Richard Packard Whitcher
James Fitz Gibbons
BY E. Frank Woodbury
ATTORNEY (No Model.) 2 Sheets—Sheet 2.
R. P. WHITCHER & J. FITZ GIBBONS.
CAR BRAKE CLAMP.

No. 562,684. Patented June 23, 1896.

WITNESSES:
Earl Vaughan
George L. Dolbeare.

INVENTORS:
Richard Packard Whitcher
James Fitz Gibbons.
BY C. Frank Woodbury.
ATTORNEY.

UNITED STATES PATENT OFFICE.

RICHARD PACKARD WHITCHER, OF SAUGUS, AND JAMES FITZ GIBBONS, OF EVERETT, MASSACHUSETTS, ASSIGNORS TO FRANCIS A. BARBEY, OF CAMBRIDGE, AND JOHN F. MULDOON, OF BOSTON, MASSACHUSETTS.

CAR-BRAKE CLAMP.

SPECIFICATION forming part of Letters Patent No. 562,684, dated June 23, 1896.

Application filed January 18, 1896. Serial No. 575,995. (No model.)

*To all whom it may concern:*

Be it known that we, RICHARD PACKARD WHITCHER, residing at Saugus, county of Essex, and JAMES FITZ GIBBONS, residing at Everett, county of Middlesex, Commonwealth of Massachusetts, citizens of the United States, have invented certain new and useful Improvements in Car-Brake Clamps, of which the following is a specification.

Our invention relates to car-brake clamps designed for use in adjusting the brakes of railway-cars.

It has for its object the production of a convenient, portable, effective, and durable apparatus of moderate cost to be used to facilitate the adjustment of car-brakes.

Figure 3:
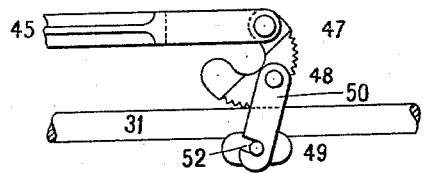
Figure 4:
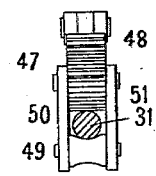
Figure 2:
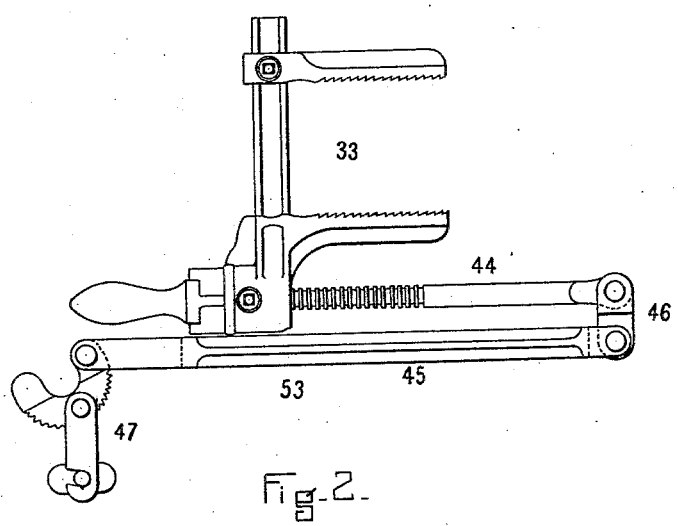
Figure 1:
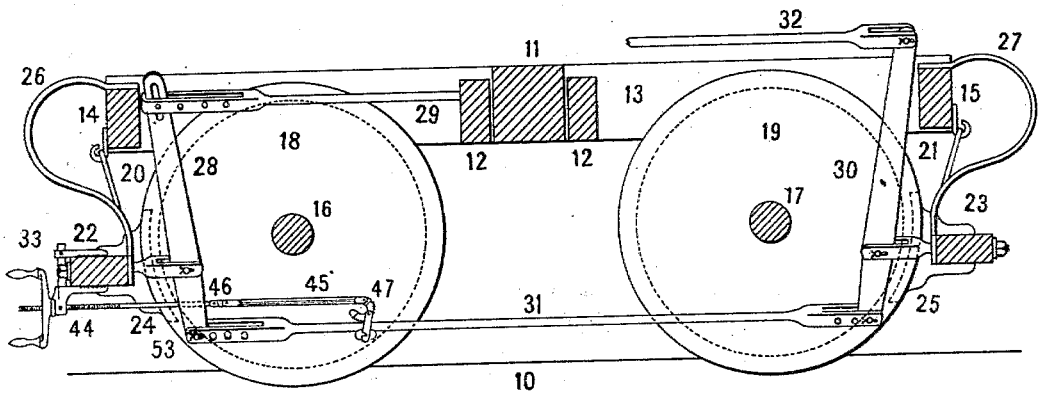
Figure 5:
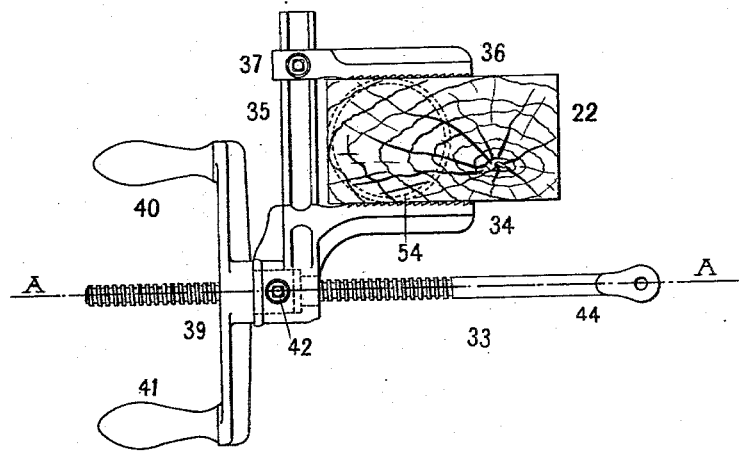
Figure 6:
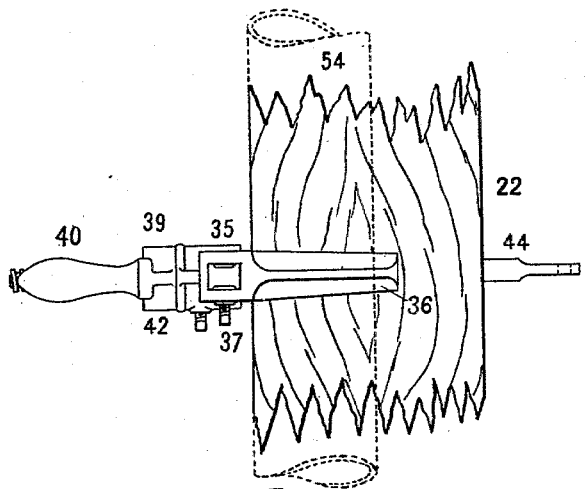
Figure 7:
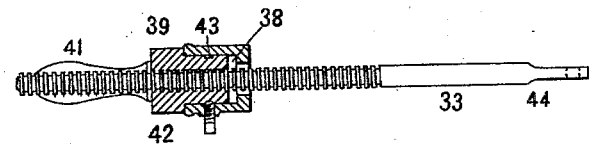

Figure 1 represents in side elevation our invention as applied to the brake-gear of an ordinary style of car-truck, which is shown in partial section. Figs. 2 to 7, inclusive, are enlarged detail views of the car-brake clamp. Fig. 2 represents the car-brake clamp in side elevation in its portable condition. Fig. 3 is a side view showing the dog applied to the lower brake-rod, and Fig. 4 is an end view of Fig. 3. Fig. 5 represents in side elevation the brake-beam clamp applied to a brake-beam. Fig. 6 is a plan view of Fig. 5, and Fig. 7 is a sectional view of Fig. 5 on line A A.

The car-truck 10 is provided with the following, all of which are of a common construction and arrangement: truck-bolster 11, transom 12, wheel-beam 13, end sills 14 and 15, axles 16 and 17, wheels 18 and 19, brake-hangers 20 and 21, brake-beams 22 and 23, brake-shoes 24 and 25, brake-release springs 26 and 27, dead-lever 28, dead-lever guide 29, live-lever 30, lower brake-rod 31, and upper brake-rod 32.

The brake-beam clamp 33 is provided with the following: fixed jaw 34, having serrated teeth; shank 35, adapted to receive the adjustable jaw 36, having serrated teeth; set-screw 37, designed to be used as a means of fastening the sliding and adjustable jaw to the shank; cavity 38, adapted to receive a portion of the drawing-nut 39, which is provided with the handles 40 and 41, and which is held, by means of the set-screw 42, that engages with the circular recess 43 in the drawing-nut, in such a manner that the drawing-nut, while it may freely revolve in the cavity 38, cannot be separated from the brake-beam clamp without loosening the set-screw 42. The drawing-nut is adapted to receive the threaded rod 44, which is connected to the forked rod 45 by means of the connecting-link 46.

The lower brake-rod dog 47 is provided with the semicircular portion 48, having teeth, as shown, the pivoted fulcrum 49, and the side links 50 and 51, link 50 being provided with the curved slot 52.

The complete car-brake clamp 53, folded up in its portable state, is shown in elevation by Fig. 2 and it comprises the brake-beam clamp 33, rods 44 and 45, and connecting-link 46, and the dog 47.

The parts comprising the car-brake clamp are assembled, as shown, and the clamp is applied in the following manner: The brake-beam clamp 33 is applied to the brake-beam 22, to which the dead-lever is fastened. The serrated teeth of the fixed and adjustable jaws clamp the brake-beam, and they bite the brake-beam if the brake-beam clamp be applied to an iron brake-beam, as 54, such as is shown in dotted outline in Figs. 5 and 6, in a manner similar to that of pipe-tongs. The dog 47 is then applied to the lower brake-rod 31, by, first, swinging the side link 50 out of engagement with the pivoted fulcrum 49; second, by slipping the dog sidewise over onto lower brake-rod; third, by swinging the side link 50 back into engagement and connection with pivoted fulcrum. It will be observed that the dog is applied to that part or end of the lower brake-rod that is near the dead-lever. By the turning or the making up of the drawing-nut, using the handles, the brake-beam clamp being firmly clamped to the brake-beam and the dog 47 firmly gripping and biting the lower brake-rod, and by reason of its construction, as shown, the greater the draw exerted by the drawing-nut the harder the dog bites into and grips the lower brake-rod, and the brake-beam 22 and the lower brake-rod 31 are drawn toward each other, thereby readily permitting brake slack adjustments and brake-shoe renewals, which adjustments and renewals may be made in the usual manner.

The car-brake clamp being applied to the dead-lever end of the lower brake-rod makes necessary only one application of the apparatus in order to make the usual adjustments and renewals, all of which can be expeditiously and easily accomplished.

In the ordinary car the dead-lever ends of both trucks being nearer the center than the ends of the car, it is apparent that adjustments to the brake-gear can be handily made in a very satisfactory manner.

It is very desirable that our car-brake clamp should be, as shown and described, readily portable, of light weight, easy of application, efficient, and durable.

For portability mainly, the brake-beam clamp and dog-connecting rod are composed of the threaded rod, connecting-link, and forked rod; but said connecting-rod may be made in one piece if desired.

The brake-beam clamp is provided with the fixed jaw and the sliding adjustable jaw in order that it may be readily applied to the various styles and sizes of brake-beams in use, and the jaws having serrated teeth, when the clamp is applied to an iron brake-beam, round or partially round in cross-section, it will clamp or bite the brake-beam like pipe-tongs.

The result sought to be obtained by the application of our device being (as previously stated) to draw the brake-beam, to which the dead-lever is fastened, and the lower brake-rod toward each other, it is obvious that substantially the same result may be obtained by applying clamp 33 to the lower end of the dead-lever. It will usually be more convenient to apply our device to the brake-beam instead of to the dead-lever, especially when the device is applied to a truck having wood brake-beams.

The dog being constructed as shown and described it can be be readily and effectively applied, without adjustment, to lower brake-rods such as are in common use and which vary more or less in diameter.

We claim as our invention—

1. The portable car-brake clamp, composed of the clamp 33, threaded rod 44, connecting-link 46, forked rod 45, and dog 47, substantially as described.

2. In a car-brake clamp, the brake-beam clamp provided with the fixed jaw, the adjustable jaw, and the drawing-nut, in combination with the brake-beam clamp and dog-connecting rod and the lower brake-rod dog, substantially as described.

3. In a car-brake clamp, the clamp 33, provided with the following: fixed jaw 34 having serrated teeth; shank 35 adapted to receive the sliding and adjustable jaw 36 having serrated teeth; set-screw 37; cavity 38; and drawing-nut 39 having the handles 40 and 41, set-screw 42, and circular recess 43, in combination with the brake-beam clamp and dog-connecting rod and the lower brake-rod dog, substantially as described.

4. In a car-brake clamp, the brake-beam clamp provided with the drawing-nut adapted to receive the threaded rod 44 which is connected to the forked rod 45 by means of the connecting-link 46, in combination with the lower brake-rod dog, substantially as described.

5. In a car-brake clamp, the brake-beam clamp, and the brake-beam clamp and dog-connecting rod, in combination with the dog which is provided with the following: semi-circular portion 48 having teeth; the pivoted fulcrum 49; and the side links 50 and 51, the link 50 being provided with the slot 52, substantially as described.

In testimony whereof we have signed our names to this specification in the presence of two subscribing witnesses.

RICHARD PACKARD WHITCHER.
    JAMES FITZ GIBBONS.

Witnesses:
 E. FRANK WOODBURY,
 GEORGE L. DOLBEARE.